(12) United States Patent
Yu et al.

(10) Patent No.: US 7,495,894 B2
(45) Date of Patent: Feb. 24, 2009

(54) LIQUID CRYSTAL DISPLAY

(75) Inventors: Chuan-Pei Yu, I-Lan Hsien (TW);
Chung-Liang Hsiao, Chi-Lung (TW)

(73) Assignees: Innocom Technology (Shenzhen) Co. Ltd, Shen Zhen, Guangdong Province (CN); Innolux Display Corp., Miao-Li County (TW)

( * ) Notice: Subject to any disclaimer, the term of this patent is extended or adjusted under 35 U.S.C. 154(b) by 368 days.

(21) Appl. No.: 11/307,470

(22) Filed: Feb. 8, 2006

(65) Prior Publication Data
US 2007/0103854 A1    May 10, 2007

(30) Foreign Application Priority Data
Nov. 4, 2005    (TW) ............... 94138757 A

(51) Int. Cl.
*G06F 1/16* (2006.01)

(52) U.S. Cl. ............. 361/681; 52/302.1; 209/410; 349/176

(58) Field of Classification Search ........... 257/99–100; 52/204.1, 302.1; 209/311, 410; 349/60, 349/176; 345/97; 361/679–687, 724–727
See application file for complete search history.

(56) References Cited

U.S. PATENT DOCUMENTS

2001/0021003 A1* 9/2001 Fujishiro ............ 353/30
2006/0274489 A1* 12/2006 Hawkins ............ 361/683

* cited by examiner

*Primary Examiner*—Hung V Duong
(74) *Attorney, Agent, or Firm*—Wei Te Chung

(57) ABSTRACT

A structure of a liquid crystal display includes a first housing, a display panel module, a second housing, and a frame-structure layer. The first housing includes a first wall forming a compartment for the display panel module. The second housing includes a covering plane and a second wall. An edge of the display panel module is covered by the covering plane, and the first wall is surrounded by the second wall. The frame-structure layer is positioned between the first housing and the second housing.

11 Claims, 5 Drawing Sheets

LIQUID CRYSTAL DISPLAY

BACKGROUND OF THE INVENTION

1. Field of the Invention

The invention relates to a liquid crystal display, and more particularly, to a liquid crystal display including a frame-structure layer to improve the fixity between a display panel module and a touch panel.

2. Description of the Prior Art

A liquid crystal display is a flat display device with thin appearance and light weight. Because the typical liquid crystal display has little radiation pollution, a user can use it for a long time without eye strain. With the additional advantages of small size and low power consumption, liquid crystal displays are widely used.

Please refer to FIG. 1 and FIG. 2. FIG. 1 is a schematic diagram illustrating a touch liquid crystal display 10 according to the prior art, and FIG. 2 is a schematic diagram illustrating a metal housing 16 of the touch liquid crystal display 10 in FIG. 1. As shown in FIG. 1, the prior art touch liquid crystal display 10 comprises a plastic housing 12, a display panel module 14, a metal housing 16, and a touch panel 18. The plastic housing 12 comprises a base 12a and a wall 12b, and the wall 12b surrounds the base 12a. The display panel module 14 is positioned on the base 12a of the plastic housing 12. The display panel module 14 contacts the plastic housing 12, and is surrounded by the base 12a and the wall 12b. The structure of the display panel module 14 depends on the needed design of the display device. Take a panel module of a back light liquid crystal display, for example, comprising a liquid crystal panel 14a and a back light module 14b. The back light module 14b comprises a reflector, a light guide, and an optical film (not shown in the figure). The metal housing 16 comprises a covering plane 16a and a wall 16b. The covering plane 16a covers an edge of the display panel module 14, and an inner surface of the wall 16b of the metal housing 16 surrounds an outer surface of the wall 12b of the plastic housing 12. The touch panel 18 is positioned on the metal housing 16, and contacts the covering plane 16a. Users can directly enter their commands by way of the touch panel 18.

Installing the metal housing 16 in the prior art touch liquid crystal display 10 can fix the touch panel 18, and prevent electromagnetic interference. As shown in FIG. 2, an included angle 16c between the wall 16b and the covering plane 16a of the metal housing 16 is smaller than 90 degrees, so that the plastic housing 12 and the display panel module 14 are fixed within the metal housing 16. The included angle 16c of the metal housing 16 with such design becomes 90 degrees after the metal housing 16 is reworked. Besides, there is a tolerance between the metal housing 16 and the plastic housing 12. Because of the tolerance and the larger included angle 16c, the metal housing 16 and the plastic housing 12 are displaced a small amount. Additionally, there are interstices between the metal housing 16 and the plastic housing 12 after the metal housing 16 and the plastic housing 12 are combined. Particles or the foreign objects may slip into these interstices. Moreover, light of the display panel module 14 may leak out through the interstices between the touch panel 18 and the display panel module 14. Because the included angle 16c between the wall 16b and the covering plane 16a of the metal housing 16 may be larger than 90 degrees after the metal housing 16 is reworked, it is harder to fix the metal housing 16 to the plastic housing 12. Therefore, the original metal housing 16 is usually replaced by a new metal housing 16 in which the included angle 16c between the wall 16b and the covering plane 16a is smaller than 90 degrees after the metal housing 16 is reworked. Because the original metal housing 16 is replaced by a new metal housing 16, the touch panel 18 should be removed from the surface of the original metal housing 16. The touch panel 18 may be damaged when it is removed from the original metal housing 16. In other words, due to the structure of the prior art touch liquid crystal display 10, the reworking process for the prior art touch liquid crystal display 10 is difficult and complicated. Furthermore, an external force may damage the display panel module 14 if the prior art touch liquid crystal display 10 is dropped or is bumped. Because of the damage by such an external force, the operation of the prior art touch liquid crystal display 10 is influenced.

Thus, there is a need for a structure of a liquid crystal display which can prevent foreign objects from slipping into spaces between the touch panel and the display panel module, prevent light leakage, improve the fixity between the metal housing and the plastic housing, and protect the liquid crystal display from damage.

SUMMARY OF THE INVENTION

It is therefore an objective of the present invention to provide a liquid crystal display to solve the above-mentioned problems.

According to the present invention, a liquid crystal display comprises a first housing comprising a first wall forming a compartment; a display panel module positioned in the compartment of the first housing; a second housing comprising a covering plane and a second wall, the covering plane covering an edge of the display panel module as an inner surface of the second wall surrounding an outer surface of the first wall; and a frame-structure layer positioned between the first housing and the second housing.

The second wall is fixed onto the first housing in the liquid crystal display by utilizing the frame-structure layer, and the frame-structure layer, the display panel module, the first housing, the second housing, and the touch panel enclose a closed space. Thus, the present invention effectively improves the fixity between the first housing and the second housing, and prevents the prior art problems, such as the damage to the liquid crystal display by external force.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
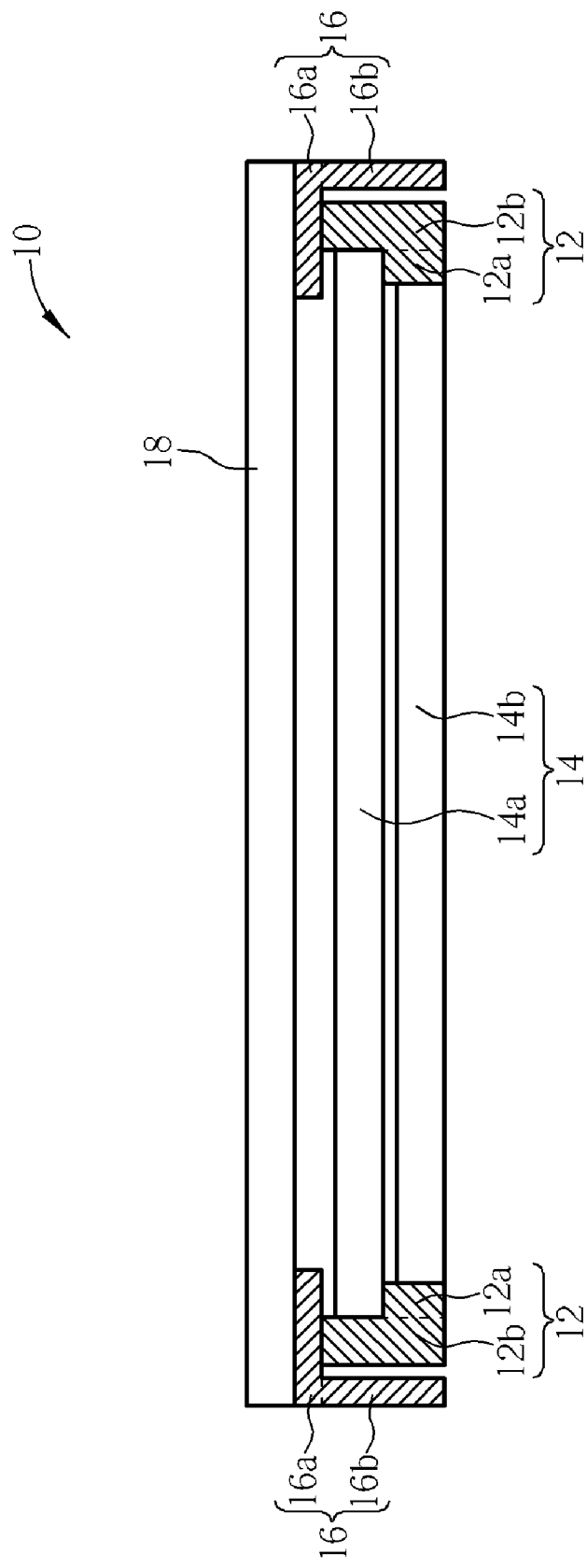
FIG. 1 is a schematic diagram illustrating a touch liquid crystal display according to the prior art.
Figure 2:
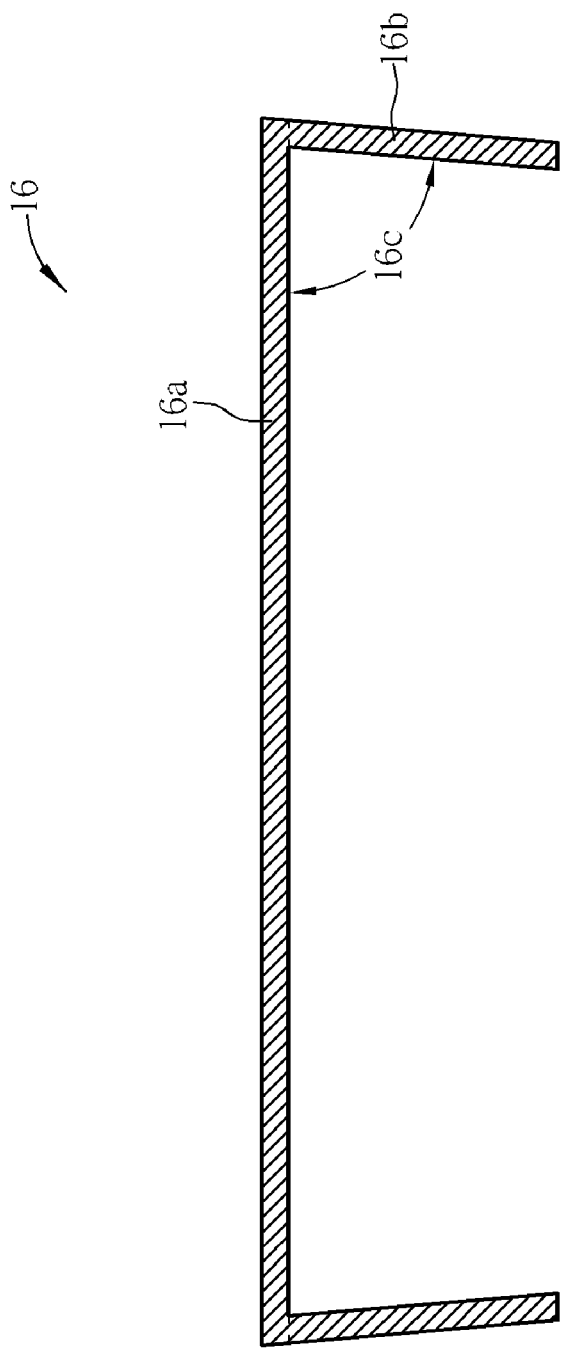
FIG. 2 is a schematic diagram illustrating a metal housing of the touch liquid crystal display in FIG. 1.
Figure 3:
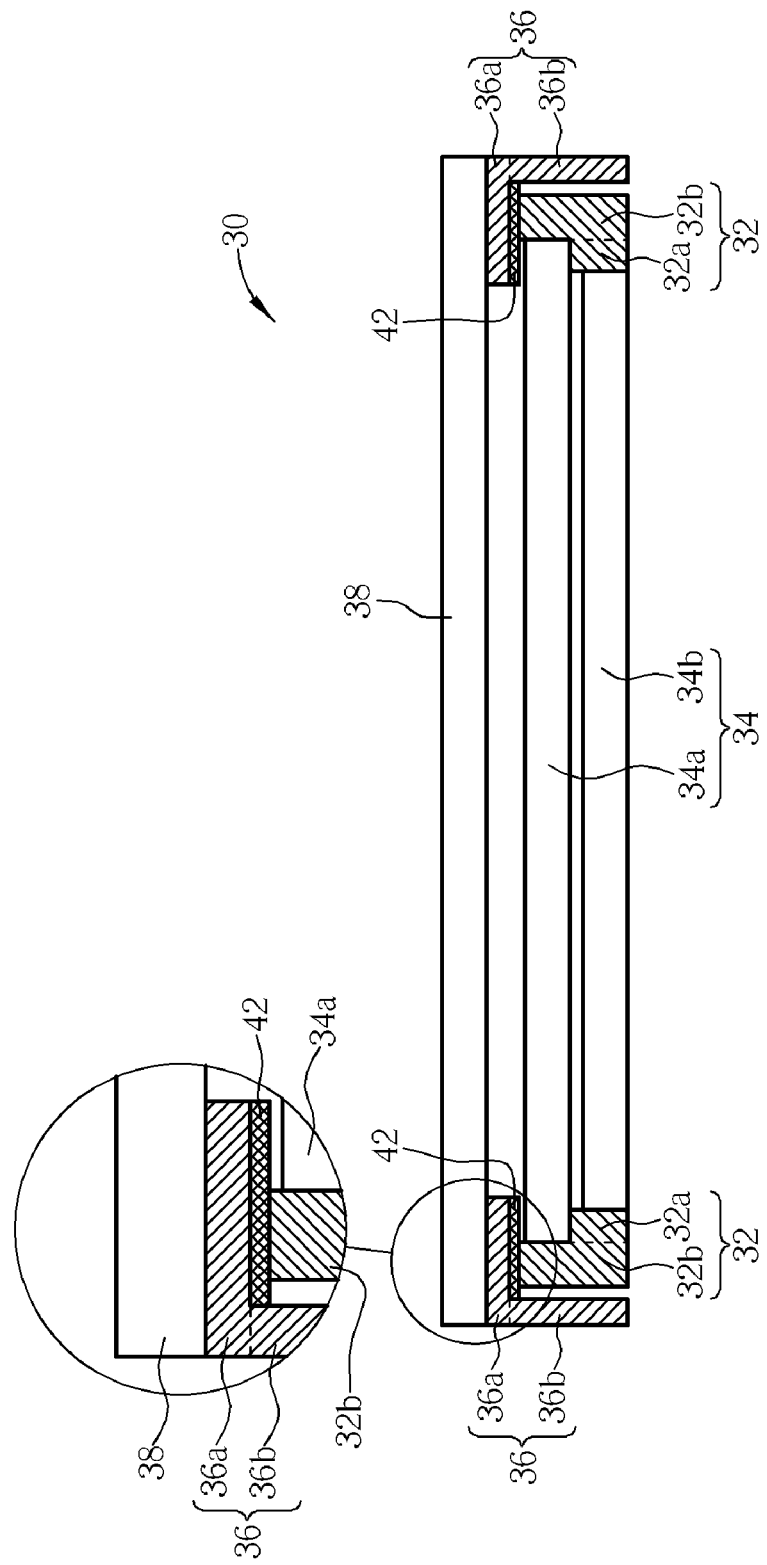
FIG. 3 is a schematic diagram illustrating a touch liquid crystal display according to a preferred embodiment of the present invention.
Figure 4:
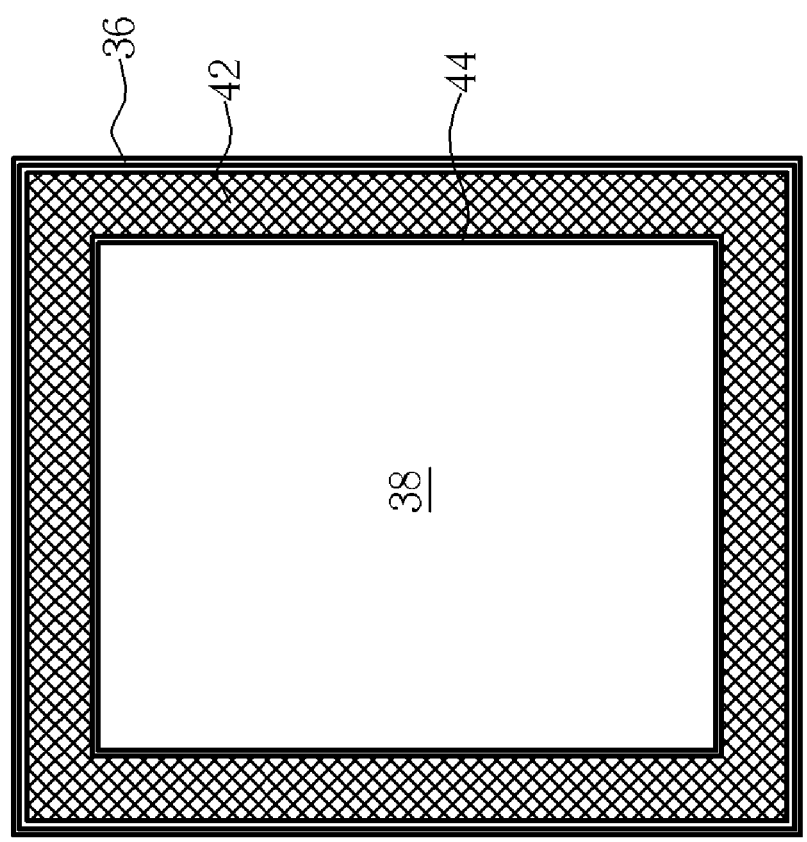
FIG. 4 is a bottom view of some components of the touch liquid crystal display in FIG. 3.

Please refer to FIG. 3 and FIG. 4. FIG. 3 is a schematic diagram illustrating a touch liquid crystal display 30 according to a preferred embodiment of the present invention, and FIG. 4 is a bottom view of some components of the touch liquid crystal display 30 in FIG. 3. As shown in FIG. 3, the touch liquid crystal display 30 comprises a first housing 32, a display panel module 34, a second housing 36, a touch panel 38, and a frame-structure layer 42. In order to realize the structure of the touch liquid crystal display 30, the relative positions of the components are shown as the following. The first housing 32 comprises a base 32a and a first wall 32b, and the first wall 32b surrounds the periphery of the base 32a so as to define a compartment for the display panel module 34. The display panel module 34 comprises a liquid crystal panel 34a and a backlight module 34b, and is positioned on the base 32a of the first housing 32. Specifically speaking, the display panel module 34 contacts the first housing 32, and is surrounded by the base 32a and the first wall 32b. The second housing 36 comprises a covering plane 36a and a second wall 36b. The covering plane 36a covers an edge of the display panel module 34 and a top of the first wall 32b of the first housing 32. In addition, an inner surface of the second wall 36b of the second housing 36 surrounds an outer surface of the first wall 32b of the first housing 32.

FIG. 4 shows the second housing 36, the touch panel 38, and the frame-structure layer 42. The covering plane 36a of the second housing 36 comprises a display opening 44 to expose a display area of the display panel module 34. The touch panel 38 is fixed onto the second housing 36 and contacts the covering plane 36a. It deserves to be mentioned that the frame-structure layer 42 is positioned under the covering plane 36a of the second housing 36 and above the first wall 32b of the first housing 32, and that the frame-structure layer 42 directly contacts a bottom surface of the covering plane 36a and a top surface of the first wall 32b. Preferably, said frame-structure layer 42 is a dark glue layer, such as a black frame-structure twin adhesive. Therefore, the frame-structure layer 42 can fix the covering plane 36a of the second housing 36 onto the top surface of the first housing 32 by its adhesive ability, and prevent light leakage by its dark color. Additionally, the frame-structure layer 42 can cover both the first wall 32b and the edge of the display panel module 34. The frame-structure layer 42, the display panel module 34, the first housing 32, the second housing 36 and the touch panel 38 enclose a closed space, so the touch liquid crystal display 30 can prevent particle entry and light leakage. The materials of the first housing 32 and the second housing 36 can be any materials of a usual housing, such as plastics or metals, and the structure of the display panel module 34 depends on the type of the display.

Figure 5:
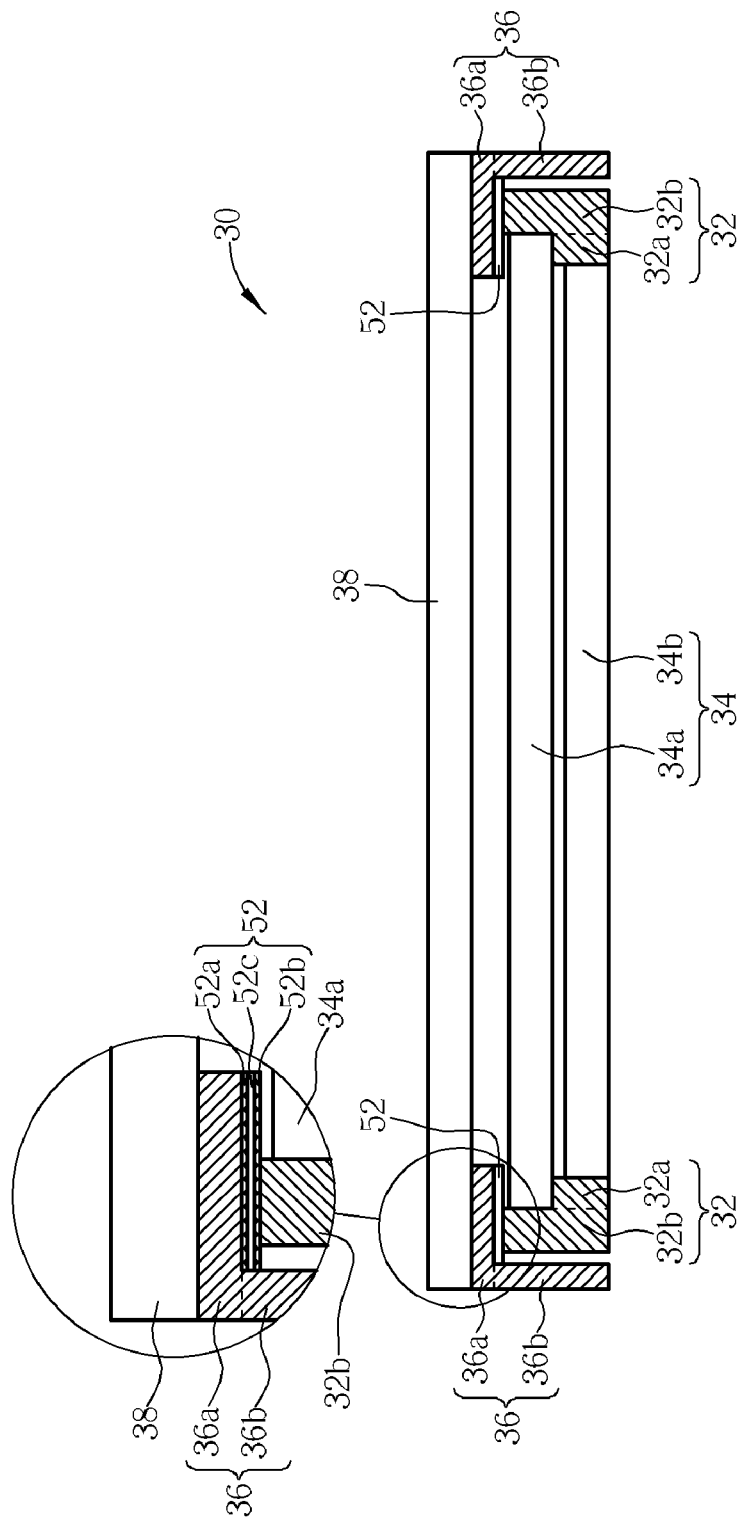
FIG. 5 is a schematic diagram illustrating a touch liquid crystal display according to another preferred embodiment of the present invention.

Please refer to FIG. 5. FIG. 5 is a schematic diagram illustrating a touch liquid crystal display 30 according to another preferred embodiment of the present invention. Regarding the embodiment discussed previously, like labels are carried forward to FIG. 5. As shown in FIG. 5, the difference between this embodiment and the previous embodiment is the structure of the frame-structure layer 52. The frame-structure layer 52 is a composite structure comprising two dark glue layers 52a, 52b and a buffer layer 52c. The buffer layer 52c is positioned between the two dark glue layers 52a, 52b. The material of the buffer layer 52c is selected as polyurethane, expanded polyethylene (EPE), or expanded polypropylene (EPP). Therefore, the frame-structure layer can protect the touch liquid crystal display 30 from damage by utilizing the buffer layer 52c if the touch liquid crystal display 30 is dropped or is bumped. Furthermore, the frame-structure layer 42 may comprise a dark compressible material, such as a black resin, so the frame-structure layer 42 can absorb shock, prevent particle entry, and prevent light leakage.

In the previous embodiments, the touch liquid crystal display 30 comprises a touch panel 38 positioned above the second housing 36 and contacting the covering plane 36a. However, the present invention is not limited by the structure of the touch liquid crystal display 30. The touch panel 38 is not necessary for the present invention. Without the touch panel 38, the frame-structure layer 42 still can improve the fixity between the first housing 32 and the second housing 36, prevent light leakage through the interstices, and absorb shock. The difference is that the frame-structure layer 42, the display panel module 34, the first housing 32, and the second housing 36 do not enclose a closed space without the touch panel 38.

In summary, the present invention provides a liquid crystal display with a frame-structure layer between the first housing and the second housing. Thus, the present invention effectively improves the fixity between the first housing and the second housing compared to a liquid crystal display without the frame-structure layer. Additionally, because of the frame-structure layer, the first housing and the second housing match better, and shock is absorbed. Thus, the present invention can prevent particle entry, prevent light leakage, and avoid damage to the liquid crystal display by external force. On the other hand, only the frame-structure layer is replaced to effectively fix the second wall onto the first housing when the liquid crystal display is reworked. The second housing and the touch panel can be reused without extra work. For a liquid crystal display without a frame-structure layer, the original second housing should be replaced by a new second housing, and the touch panel should be removed from the surface of the original second housing. The reworking process for the liquid crystal display without a frame-structure layer is difficult and complicated. Therefore, the liquid crystal display of the present invention costs less time and money to fabricate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display comprising:
   a first housing, the first housing comprising a first wall forming a compartment;
   a display panel module positioned in the compartment of the first housing;
   a second housing comprising a covering plane and a second wall, the covering plane covering an edge of the display panel module, with an inner surface of the second wall surrounding an outer surface of the first wall; and
   a frame-structure layer positioned between the first housing and the second housing; wherein the frame-structure layer comprises a dark glue layer to fix the covering plane of the second housing onto the top surface of the first housing.

2. The liquid crystal display of claim 1, wherein the dark glue layer is a black frame-structure twin adhesive.

3. The liquid crystal display of claim 1, wherein the frame-structure layer further comprises another dark glue layer and a buffer layer, and the buffer layer is positioned between the two dark glue layers.

4. The liquid crystal display of claim 3, wherein a material of the buffer layer is selected from a group of polyurethane, expanded polyethylene (EPE) and expanded polypropylene (EPP).

5. The liquid crystal display of claim 1, wherein the covering plane of the second housing comprises a display opening to expose a display area of the display panel module.

6. The liquid crystal display of claim 1, wherein the frame-structure layer is positioned under the covering plane of the second housing and above the first wall of the first housing, and the frame-structure layer directly contacts a bottom surface of the covering plane and a top surface of the first wall.

7. The liquid crystal display of claim 1, wherein the frame-structure layer covers both of the first wall and the edge of the display panel module.

8. A liquid crystal display comprising:
 a first housing, the first housing comprising a first wall forming a compartment;
 a display panel module positioned in the compartment of the first housing;
 a second housing comprising a covering plane and a second wall, the covering plane covering an edge of the display panel module, with an inner surface of the second wall surrounding an outer surface of the first wall; and
 a frame-structure layer positioned between the first housing and the second housing; wherein the frame-structure layer comprises a dark compressible material.

9. The liquid crystal display of claim 8, wherein the dark compressible material comprises a black resin.

10. A liquid crystal display comprising:
 a first housing, the first housing comprising a first wall forming a compartment;
 a display panel module positioned in the compartment of the first housing;
 a second housing comprising a covering plane and a second wall, the covering plane covering an edge of the display panel module, with an inner surface of the second wall surrounding an outer surface of the first wall;
 a frame-structure layer positioned between the first housing and the second housing; and a touch panel positioned above the second housing and contacting the covering plane.

11. The liquid crystal display of claim 10, wherein the frame-structure layer, the display panel module, the first housing, the second housing and the touch panel enclose a closed space.

* * * * *